US012712196B2

(12) United States Patent
An

(10) Patent No.: US 12,712,196 B2
(45) Date of Patent: Aug. 18, 2026

(54) TAPING DEVICE FOR SECONDARY BATTERY AND SECONDARY BATTERY MANUFACTURED USING THE SAME

(71) Applicant: Samsung SDI Co., Ltd., Yongin-si (KR)

(72) Inventor: Gwang Tae An, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 59 days.

(21) Appl. No.: 18/733,643

(22) Filed: Jun. 4, 2024

(65) Prior Publication Data

US 2025/0167275 A1 May 22, 2025

(30) Foreign Application Priority Data

Nov. 16, 2023 (KR) ........................ 10-2023-0158844

(51) Int. Cl.
*H01M 10/04* (2006.01)
*H01M 50/102* (2021.01)

(52) U.S. Cl.
CPC ..... *H01M 10/0404* (2013.01); *H01M 50/102* (2021.01)

(58) Field of Classification Search
CPC ........... H01M 10/0404; H01M 50/102; H01M 4/139; B65H 2404/52131;
(Continued)

(56) References Cited

U.S. PATENT DOCUMENTS 4,002,522 A * 1/1977 Catozzo ............... G03D 15/043 156/506
7,967,047 B2 * 6/2011 Fujii .................. B29C 66/8221 156/518
(Continued)

FOREIGN PATENT DOCUMENTS

KR 20120069905 * 6/2012 ............... B32B 7/12
KR 10-1297008 B1 8/2013
(Continued)

OTHER PUBLICATIONS

Extended European Search Report for Application No. 24194422.2, dated Feb. 17, 2025, 8 pages.

*Primary Examiner* — George R Koch
*Assistant Examiner* — Christopher C Caillouet
(74) *Attorney, Agent, or Firm* — Womble Bond Dickinson (US) LLP

(57) ABSTRACT

A taping device for a secondary battery includes: a taping unit configured to attach an adhesive member at an adhesive member attachment position of an outer surface of an electrode assembly; a driving unit configured to locate the taping unit at the adhesive member attachment position of the electrode assembly and to move the taping unit in an outward direction of the electrode assembly; and a supply unit configured to supply the adhesive member to the taping unit. The taping unit includes an adhesive member movement surface on which the adhesive member is placed, a pressing surface configured to press the adhesive member to be in close contact with the adhesive member attachment position of the electrode assembly and at least one groove at at least one of a pair of long side edges of the pressing surface of the adhesive member movement surface.

17 Claims, 4 Drawing Sheets

(58) Field of Classification Search
CPC ........ B65H 2404/563; B65H 2404/611; B65H 2405/575; B65H 2701/1315; B65H 2701/132; B65H 2801/72; B65H 35/0013; Y02E 60/10; Y02P 70/50
See application file for complete search history.

(56) References Cited

U.S. PATENT DOCUMENTS

| | | | | |
|---|---|---|---|---|
| 8,875,768 | B2 | 11/2014 | Stancu et al. | |
| 2018/0215490 | A1* | 8/2018 | Choi | H01M 10/0404 |
| 2022/0013844 | A1* | 1/2022 | Choi | B65H 37/04 |
| 2023/0055489 | A1 | 2/2023 | Lee et al. | |

FOREIGN PATENT DOCUMENTS

| | | | |
|---|---|---|---|
| KR | 10-1840859 | B1 | 3/2018 |
| KR | 10-2111445 | B1 | 5/2020 |
| KR | 10-2023-0092350 | A | 6/2023 |

* cited by examiner

TAPING DEVICE FOR SECONDARY BATTERY AND SECONDARY BATTERY MANUFACTURED USING THE SAME

CROSS-REFERENCE TO RELATED APPLICATION

The present application claims priority to and the benefit of Korean Patent Application No. 10-2023-0158844, filed on Nov. 16, 2023, in the Korean Intellectual Property Office, the entire disclosure of which is incorporated herein by reference.

BACKGROUND

1. Field

Aspects of embodiments of the present disclosure relate to a taping device for a secondary battery and a secondary battery manufactured using the same.

2. Description of the Related Art

Unlike a primary battery that cannot be charged, a secondary battery (rechargeable battery) is a battery that can be charged and discharged. A low-capacity battery in which one battery cell is packaged in the form of a pack has been mainly used in small portable electronic devices such as smartphones and digital cameras, and a large-capacity battery in the form of a module in which dozens or hundreds of battery packs are connected has been used as a power source for driving motors such as hybrid vehicles, electric vehicles, power tools, hand vacuum cleaners, or drones, or as an energy storage device.

A secondary battery may be manufactured in various shapes such as a cylindrical shape or a prismatic shape, and may be configured by housing an electrode assembly, which is formed by interposing a separator as an insulator between a positive electrode plate and a negative electrode plate, and an electrolyte together in a case, and installing a cap plate on the case. A positive terminal and a negative terminal are connected to the electrode assembly, and are exposed and protrudes to the outside through the cap plate.

During the production of an electrode assembly of a secondary battery, a process of attaching a finishing tape to the electrode assembly is performed. In this process, a phenomenon may occur in which a sticky portion of the tape is transferred to a finishing tape attachment unit, and the transferred sticky portion may cause the finishing tape to remain in the attachment unit rather than on the electrode assembly. In this manner, a defect in which the finishing tape is not attached may occur.

The above-described information disclosed in the technology that serves as the background of the present disclosure is only for improving understanding of the background of the present disclosure and thus may include information that does not constitute the related art.

SUMMARY

Embodiments of the present disclosure are directed to a taping device for a secondary battery and a secondary battery manufactured using the same. The taping device includes a groove in an adhesive member placement region of the taping device that is configured to attach an adhesive member to a secondary battery.

However, the technical problem to be solved by the present disclosure is not limited to the above-described problem, and other problems that are not described will be clearly understood by those skilled in the art from the following description.

According to an embodiment of the present disclosure, there is provided a taping device for a secondary battery, the taping device including a taping unit configured to attach an adhesive member to an adhesive member attachment position on an outer surface of an electrode assembly, a driving unit configured to locate the taping unit at the adhesive member attachment position of the electrode assembly and to move the taping unit in an outward direction of the electrode assembly, and a supply unit configured to supply the adhesive member to the taping unit. The taping unit includes an adhesive member movement surface on which the adhesive member is configured to be placed. The adhesive member movement surface includes a pair of long sides and a pair of short sides connected to the pair of long sides. The taping unit also includes a pressing surface configured to press the adhesive member to be in close contact with the adhesive member attachment position of the electrode assembly, and at least one groove extending along at least one of a pair of long side edges of the pressing surface of the adhesive member movement surface.

The taping unit may further include a cutting unit configured to cut the adhesive member placed on the adhesive member movement surface. The cutting unit may be located on one of the pair of short sides of the adhesive member movement surface.

The cutting unit may be located at the electrode assembly side, and the cutting unit may be configured to cut the adhesive member after the adhesive member is pressed by the pressing surface.

The taping unit may include a pair of grooves having the same shape.

The taping unit may include a pair of grooves having different shapes.

The taping unit may include a pair of grooves extending along substantially the entire length the adhesive member movement surface, including the pressing surface, and may be formed in the same shape.

The taping unit may include a pair grooves extending along substantially the entire length of the adhesive member movement surface, including the pressing surface, and may be formed in different shapes.

The groove may have an angular shape.

The groove may have a rounded shape.

The groove may have a “V” shape.

The taping unit may further include a guide portion at each of the pair of long sides of the adhesive member movement surface.

The guide portion may be substantially parallel to the groove.

The guide portion may protrude further outward than the groove.

The pressing surface of the taping unit may include an elastic material on a metal.

Fine holes may be in the adhesive member movement surface of the taping unit.

The taping unit may include a pair of grooves on both sides, and a width of the adhesive member in a longitudinal direction may be greater than a width between the pair of grooves formed on both sides of the pair of long side edges of the adhesive member movement surface.

A width of the adhesive member in a longitudinal direction may be smaller than a width between the guide portions formed on both sides of the pair of long side edges of the adhesive member movement surface.

According to another aspect of the present disclosure, there is provided a secondary battery manufactured using the taping device for a secondary battery.

DETAILED DESCRIPTION

Figure 1:
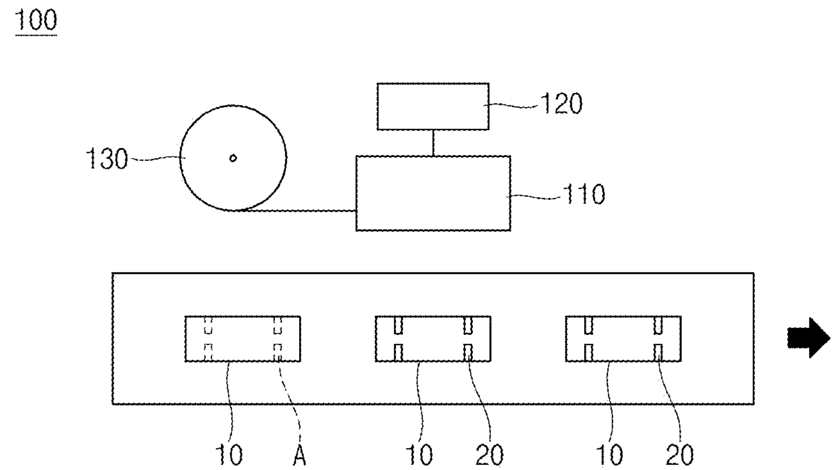
FIG. 1 is a schematic view schematically illustrating a taping device for a secondary battery according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The present disclosure covers all modifications, equivalents, and replacements within the idea and technical scope of the present disclosure. Further, each of the features of the various embodiments of the present disclosure may be combined or combined with each other, in part or in whole, and technically various interlocking and driving are possible. Each embodiment may be implemented independently of each other or may be implemented together in an association.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a schematic cross-sectional view" means when a schematic cross-section taken by vertically cutting an object portion is viewed from the side. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression such as "at least one of A and B" and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing particular embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value. Further, the use of "may" when describing embodiments of the present disclosure refers to "one or more embodiments of the present disclosure."

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The terms used herein are for describing embodiments of the present disclosure and are not intended to be limiting of the present disclosure.

Hereinafter, in exemplary embodiments of a prismatic battery according to the present disclosure, one of prismatic batteries is selected and the selected battery is described as having a general structure, and the general structure of the prismatic battery will be described in the case of generally applicable technology. However, the present disclosure is not limited thereto, and a case may be formed in various shapes such as a circular shape, a pouch shape, and the like. In addition, the case may be made of a metal such as aluminum, an aluminum alloy, and nickel-plated steel, or a laminate film or plastic that forms a pouch.

FIG. 1 is a schematic view schematically illustrating a taping device for a secondary battery according to one or more embodiments of the present disclosure.

A taping device 100 for a secondary battery according to one embodiment of the present disclosure is a device for attaching an adhesive member 20 for finishing an electrode assembly 10 to an outer surface of the electrode assembly 10 during the production of the electrode assembly 10.

In the process of attaching a finishing tape (e.g., an adhesive member) utilizing a taping device for a secondary battery, a phenomenon may occur in which a sticky portion of the tape is transferred to a tape attachment unit (e.g., a taping unit), and the finishing tape remains in the attachment unit rather than on an attachment (e.g., the electrode assembly) due to the transferred sticky portion. As a result, a defect in which the finishing tape is not attached may occur. Accordingly, in one or more embodiment of the present disclosure, a section in which the sticky portion of the finishing tape enters the attachment unit may be designed with an escape design to prevent the sticky portion from entering the tape attachment unit. Thus, in one or more embodiments, it is possible to prevent a sticky portion transfer phenomenon in which a sticky portion of a finishing tape is transferred to the finishing tape attachment unit, and the finishing tape attachment unit becomes sticky, causing the finishing tape to remain on the attachment unit instead of being transferred to the place to be attached.

Although not shown in the drawings, in the process of manufacturing a secondary battery, the electrode assembly 10 may be transferred to the taping device 100 for a secondary battery, and the adhesive member 20 may be supplied from a winding roll on which the adhesive member 20 is wound. Accordingly, the taping device 100 for a secondary battery may apply the adhesive member 20 to the transferred electrode assembly 10. A detailed description of the taping device 100 for a secondary battery will be described below.

Hereinafter, in embodiments of prismatic and pouch batteries according to the present disclosure, one of prismatic/pouch/circular batteries is selected and the selected battery is described as having a general structure, and the general structure of the prismatic/pouch/circular battery is described with respect to generally applicable technology. However, in one or more embodiments, the adhesive member 20 is illustrated in FIG. 1 as being attached to the electrode assembly 10 of a stacked type, but may also be applicable in the form of a jelly roll. The electrode assembly 10 may be accommodated in a prismatic, pouch-type, or circular case after the adhesive member 20 is attached thereto. That is, in one or more embodiments, the case may be formed in various shapes such as a circular shape, a pouch type, and the like. In addition, the case may be made of a metal such as aluminum, an aluminum alloy, and nickel-plated steel, or a laminate film or plastic that forms a pouch.

The electrode assembly 10 applied to the prismatic and pouch-type secondary batteries may be formed by winding or stacking a laminate of a first electrode plate, a separator, and a second electrode plate, which are formed as thin plates or films. When the electrode assembly 10 is a wound laminate, a winding axis may be parallel to a longitudinal direction of the case. In addition, the electrode assembly 10 may be a stack type rather than a winding type, and present disclosure is not limited to a particular shape of the electrode assembly 10. In addition, the electrode assembly 10 may be a Z stack electrode assembly 10 in which a positive electrode plate and a negative electrode plate are inserted into both sides of a separator bent in a Z stack. In addition, the electrode assembly 10 may be accommodated in the case by stacking one or more electrode assemblies 10 so that long sides thereof are adjacent to each other, and the number of electrode assemblies 10 is not limited in the present disclosure. The first electrode plate of the electrode assembly 10 may serve as a negative electrode, and the second electrode plate may serve as a positive electrode. In one or more embodiments, the first electrode plate of the electrode assembly 10 may serve as a positive electrode, and the second electrode plate may serve as a negative electrode.

The first electrode plate may be formed by applying a first electrode active material, such as graphite or carbon, on a first electrode current collector formed of a metal foil, such as copper, a copper alloy, nickel, or a nickel alloy, and may include a first electrode tab (or a first uncoated portion), which is a region to which the first electrode active material is not applied. The first electrode tab may serve as a path for current flow between the first electrode plate and a first current collector. In one or more embodiments, the first electrode tab may be formed by cutting the metal foil in advance so as to protrude from one side portion when the first electrode plate is manufactured, and the first electrode tab may protrude further from one side portion than the separator without separate cutting.

The second electrode plate may be formed by applying a second electrode active material, such as a transition metal oxide, on a second electrode current collector formed of a metal foil, such as aluminum or an aluminum alloy, and may include a second electrode tab (or a second uncoated portion) that is a region to which the second electrode active material is not applied. The second electrode tab may serve as a path for current flow between the second electrode plate and a second current collector. In one or more embodiments, the second electrode tab may be formed by cutting the metal foil in advance so as to protrude from the other side portion when the second electrode plate is manufactured, and the second electrode tab may protrude further from the other side portion than the separator without separate cutting.

In one or more embodiments, the first electrode tab may be located on a side surface of a left end side of the electrode assembly 10, and the second electrode tab may be located on a side surface of a right end side of the electrode assembly 10, or the first electrode tab and the second electrode tab may be located on one surface in the same direction (e.g., the first electrode tab and the second electrode tab may both be on the right end side or the left end side of the electrode assembly 10). The left and right sides are designated for convenience of description based on the electrode assembly 10 illustrated in FIG. 1, and when the electrode assembly 10 is rotated left and right or up and down, the positions may be changed.

The first electrode tab of the first electrode plate and the second electrode tab of the second electrode plate are respectively located at both end portions of the electrode assembly 10. In one or more embodiments, the electrode assembly 10 may be accommodated in the case together with an electrolyte. In addition, in the electrode assembly 10, the first current collector and the second current collector, which are respectively welded and connected to the first electrode tab of the first electrode plate and the second electrode tab of the second electrode plate, are exposed from both sides of the electrode assembly 10.

In one or more embodiments, an electrode assembly of a circular secondary battery may include a separator, and a first electrode and a second electrode arranged with the separator interposed (located) therebetween, and may be wound in a jelly-roll shape.

The first electrode includes a first substrate and a first active material layer located on the first substrate. A first lead tab may extend outwardly from a first uncoated portion on which a first active material layer is not located in the first substrate, and the first lead tab may be electrically connected to a cap assembly. The second electrode includes a second substrate and a second active material layer located on the second substrate. A second lead tab may extend outwardly from a second uncoated portion on which a second active material layer is not located in the second substrate, and the second lead tab may be electrically connected to a case. The first lead tab and the second lead tab may extend in opposite directions. The first electrode may function as a positive electrode. In an embodiment in which the first electrode is a positive electrode, the first substrate may be formed of, for example, an aluminum foil, and the first active material layer may include, for example, a transition metal oxide. The second electrode may function as a negative electrode. In an embodiment in which the second electrode is a negative electrode, the second substrate may be formed of, for example, a copper foil or a nickel foil, and the second active material layer may include, for example, graphite. The separator is configured to prevent a short circuit between the first and second electrodes and allowing the movement of lithium ions. The separator may be formed of, for example, a polyethylene film, a polypropylene film, a polyethylene-polypropylene film, or the like.

Referring to FIG. 1, the taping device 100 for a secondary battery may include a taping unit 110, a driving unit 120, and a supply unit 130. The taping unit 110 can attach the adhesive member 20 to an adhesive member attachment position A, which is at least a portion of the outer surface of the electrode assembly 10. As the electrode assembly 10 is transferred toward the taping device 100 by a conveyor or the like in a process of manufacturing a secondary battery, the taping unit 110 may apply (tape) the adhesive member 20 at the preset adhesive member attachment position A to finish the electrode assembly 10.

The driving unit 120 may control the movement of the taping unit 110 so that the taping unit 110 can apply (tape) the adhesive member 20 to the electrode assembly 10. The driving unit 120 may locate the taping unit 110 at the adhesive member attachment position A of the electrode assembly 10 and then move the taping unit 110 in an outward direction of the electrode assembly 10.

In addition, the supply unit 130 may provide the adhesive member 20 in order for the taping unit 110 to tape the adhesive member 20 to the electrode assembly 10. That is, the supply unit 130 may supply the adhesive member 20 to the taping unit 110.

In one or more embodiments, the adhesive member 20 may be formed in the form of a thin plate and attached to surround an outer surface of the electrode assembly 10. Thus, the adhesive member 20 is configured to cause the electrode assembly 10 to maintain its shape due. In addition, the adhesive member 20 may be in contact with an inner side of a sidewall portion of the case and may serve to protect the electrode assembly 10 in the case. In one or more embodiments, a thickness of the adhesive member 20 according to the present disclosure may be approximately 19 μm or less. When the thickness of the adhesive member 20 exceeds approximately 19 μm, a volume of an inner space in which the electrolyte can be injected may be reduced. In addition, in one or more embodiments, the thickness of the adhesive member 20 may be approximately 15 μm or more. When the thickness of the adhesive member 20 is less than approximately 15 μm, the adhesive member 20 may be too weak, and thus, it may be difficult to effectively fix the electrode assembly 10 due to tearing of the adhesive member 20 or the like.

In one or more embodiments, the adhesive member 20 may include a film layer made of a polymer resin and an adhesive layer. The polymer film layer may be formed of, for example, any one of polyethylene (PE), polyphenylene ether (PPE), polyimide (PI), polypropylene (PP), or polyethylene terephthalate (PET). In addition, the adhesive layer for attaching the polymer film layer to the electrode assembly 10 may be provided on a lower surface of the polymer film layer. In one or more embodiments, natural rubber, acrylic resin, polyurethane, polyester, or the like may be used as the adhesive layer. However, the present disclosure is not limited to the above-described materials for the polymer film layer and the adhesive layer.

In one or more embodiments, the adhesive member 20 may have one surface in contact with the electrode assembly 10 and the other surface opposite to the one surface. The one surface of the adhesive member 20 may be a surface in contact with the electrode assembly 10, and the other surface of the adhesive member 20 may be a surface in contact with the inside of the case. The adhesive layer may be applied on the one surface of the adhesive member 20, and may not be applied on the other surface thereof (e.g., the adhesive layer may be applied to an inner surface of the adhesive member 20 facing the electrode assembly 10 and the adhesive layer may not be applied to an outer surface of the adhesive member facing away from the electrode assembly 10 and facing the case). The other surface of the adhesive member 20 may be the film layer. In one or more embodiments, the adhesive layer is not applied to a side surface of the adhesive member 20 connecting the one surface and the other surface of the adhesive member 20, but the adhesive layer may be transferred to the side surface during the manufacturing process.

Figure 2:
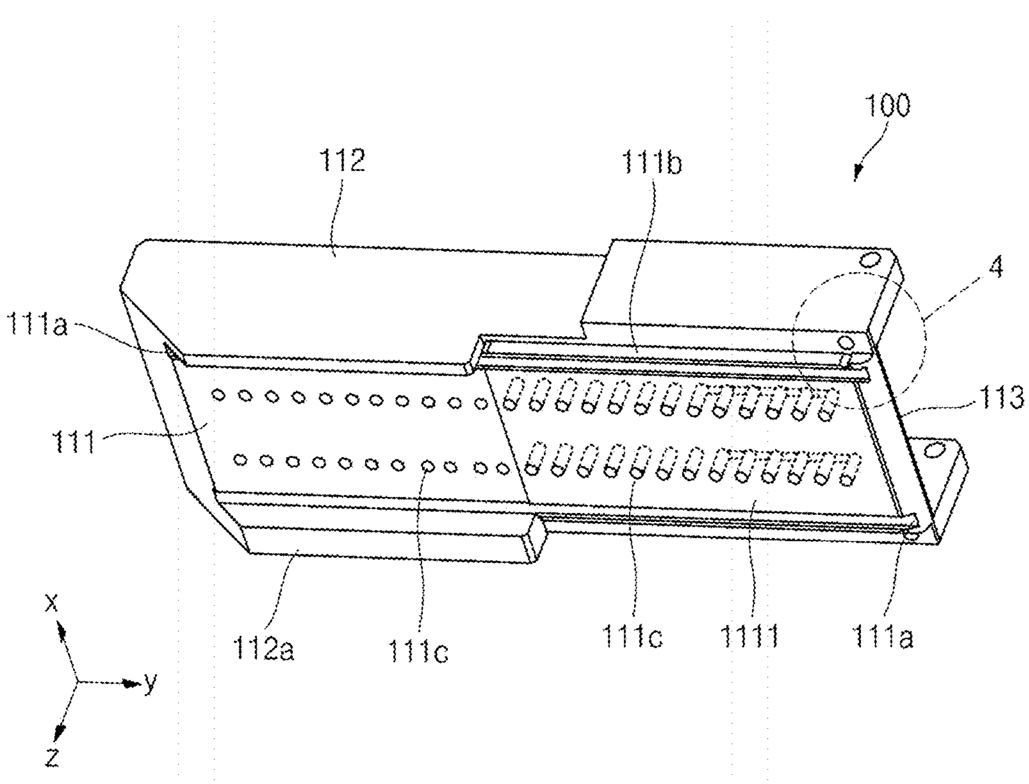
FIG. 2 is a perspective view of a taping unit according to the embodiment of the present disclosure.
Figure 3:
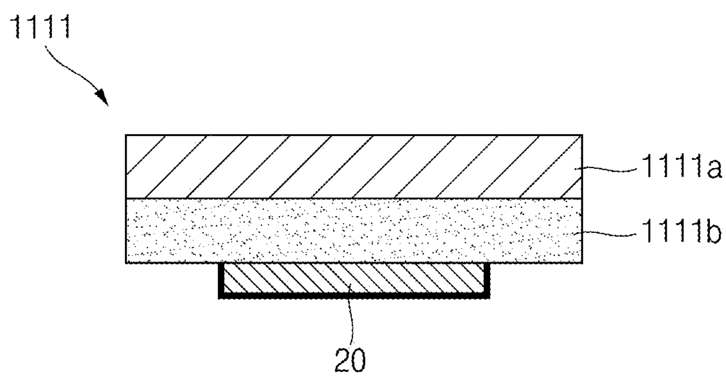
FIG. 3 is an enlarged cross-sectional view of a pressing surface according to an embodiment of the present disclosure.
Figure 4:
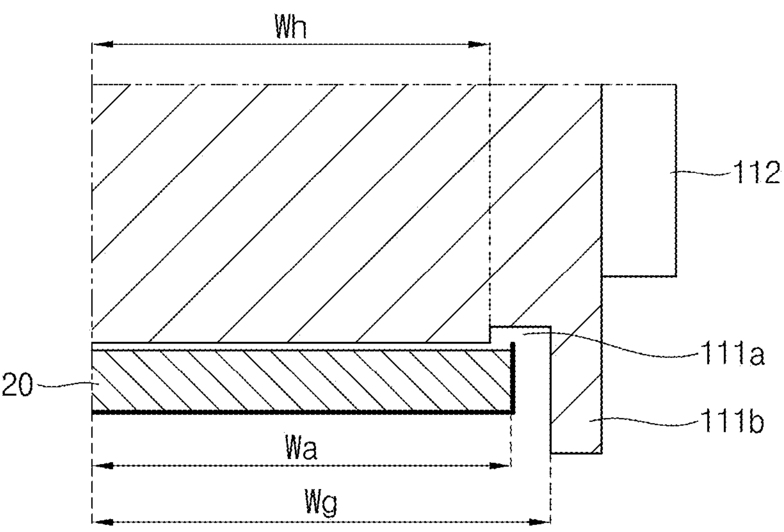
FIG. 4 is an enlarged right-side view of one side of a groove portion of the taping unit shown in FIG. 2.
Figure 5:
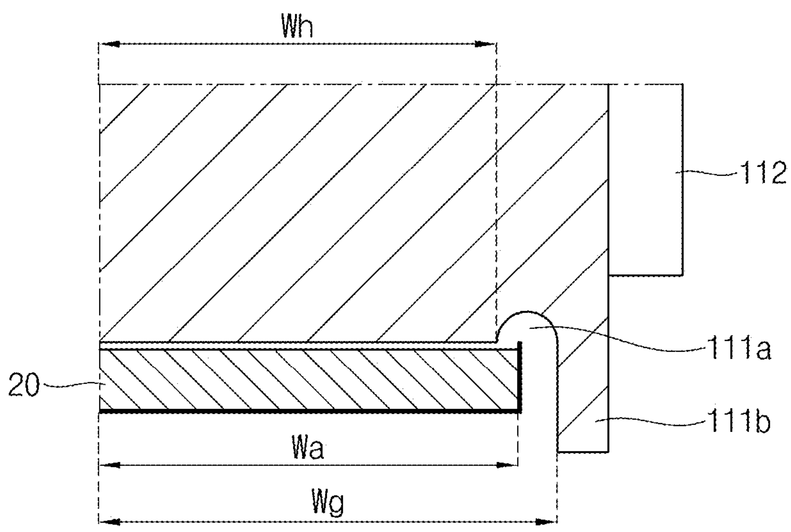
FIG. 5 is a right-side view illustrating a rounded groove according to various embodiments.
Figure 6:
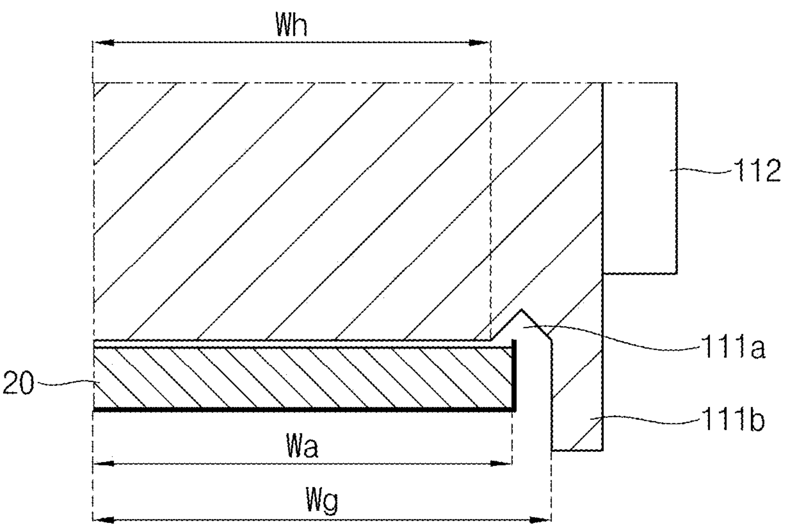
FIG. 6 is a right-side view illustrating a sharp bending groove according to various embodiments.

FIG. 2 is a perspective view of the taping unit according to the embodiment of the present disclosure. FIG. 3 is an enlarged cross-sectional view of a pressing surface according to an embodiment of the present disclosure. FIG. 4 is an enlarged right-side view of one side of a groove portion of the taping unit shown in FIG. 2. FIG. 5 is a right-side view illustrating a rounded groove according to various embodiments of the present disclosure. FIG. 6 is a right-side view illustrating a sharp bending groove according to various embodiments of the present disclosure.

Accordingly, referring to FIGS. 2 to 6, in one or more embodiments, a groove 111*a* may be formed in an adhesive member movement surface 111 of the taping unit 110 to prevent (or at least mitigate against) the adhesive layer on the one surface of the adhesive member 20 from transferring to the side surface of the adhesive member 20.

Referring to the embodiment depicted in FIG. 2, the taping unit 110 may include the adhesive member movement surface 111 on which the adhesive member 20 is placed, and a body 112 connected to the adhesive member movement surface 111. In one or more embodiments, the adhesive member movement surface 111 may be at or on a bottom surface of the body 112 (based on FIG. 2). The adhesive member movement surface 111 may include a pair of long sides and a pair of short sides connected to the long sides. In one or more embodiments, the adhesive member 20 may enter one of the short sides (left side in FIG. 2) of the adhesive member movement surface 111 and may be attached to the electrode assembly 10 on the other side of the short sides (right side in FIG. 2). The pair of long sides of the adhesive member movement surface 111 may extend lengthwise in a longitudinal direction in which the adhesive member 20 moves.

In one or more embodiments, the taping unit 110 may include a cutting unit 113 configured to cut the adhesive member 20 placed on the adhesive member movement surface 111. In order to attach the adhesive member 20 to the electrode assembly 10 at the other side (right side of FIG. 2) of the short sides of the adhesive member movement surface 111 of the taping unit 110, the cutting unit 113 may be formed on the other side (right side of FIG. 2) of the short sides of the adhesive member movement surface 111. That is, the cutting unit 113 is located at the electrode assembly 10 side, and may cut the adhesive member 20 after the adhesive member 20 is pressed by a pressing surface 1111 to be described later. In one or more embodiments, the cutting unit 113 may cut the adhesive member 20 placed on the adhesive member movement surface 111 to a length corresponding to the adhesive member attachment position A.

Further, referring to the embodiment depicted in FIGS. 2 and 3, the pressing surface 1111 is configured to press the adhesive member 20 to be in close contact with the adhesive member attachment position A of the electrode assembly 10 and the pressing surface 1111 may be formed on the adhesive member movement surface 111. The pressing surface 1111 may include a metal layer 1111*a* and an elastic layer 1111*b* on the metal layer 1111*a*. In one or more embodiments, the pressing surface 1111 of the taping unit 110 may be formed by stacking an elastic material (e.g., a urethane cushion) on a metal. Thus, during the manufacturing process of attaching the adhesive member 20 to the electrode assembly 10, the adhesive member 20 may be pressed by the elastic layer 1111*b* of the pressing surface 1111 to be accurately attached to the electrode assembly 10.

Referring to the embodiment depicted in FIG. 4, a groove 111*a* may be formed on at least one of a pair of long side edges of the pressing surface 1111 of the adhesive member movement surface 111. That is, an escape groove 111*a* for preventing transfer of a sticky portion may be formed on the long side edge of the pressing surface 1111, which corresponds to the side surface of the adhesive member 20. FIG. 4 illustrates a portion of the groove 111*a* at one side of the taping unit 110, and is a cutaway view of a right end of the taping unit 110 (FIGS. 5 and 6 illustrate other shapes of the same position). In one or more embodiments, the grooves 111*a* may be formed in the same shape at the pair of long side edges of the pressing surface 1111 (e.g., both long side edges of the pressing surface 1111 may include the same groove 111*a*). In one or more embodiments, the grooves 111*a* may be formed (e.g., machined) in the shape of a number "11" into the pressing surface 1111. In one or more embodiments, the groove 111*a* may be formed in an angular shape. Forming the groove 111*a* in an angular shape may mean that a bottom surface of the groove 111*a* is formed in a planar shape. In one or more embodiments, a side surface connected to the bottom surface of the groove 111*a* is formed in a straight line shape such that the groove 111*a* may be formed in a rectangular shape of which one side is open. However, the present disclosure is not limited thereto, and in one or more embodiments the side surface may be connected to the bottom surface of the groove 111*a* by a diagonal line such that the groove 111*a* may be formed in a trapezoidal shape of which one side is open.

In one or more embodiments, the grooves 111*a* may be formed in different shapes at the pair of long side edges of the pressing surface 1111. For instance, in one or more embodiments, the groove 111*a* on one of long sides of the pressing surface 1111 may have an angular shape, and the groove 111*a* on the other one of the long sides thereof may be formed differently, such as a rounded shape to be described later.

Referring to embodiment illustrated in FIG. 2, the groove 111*a* may be entirely formed in the adhesive member movement surface 111, including the pressing surface 1111 (e.g., each of the grooves 111*a* may extend along the entire (or substantially the entire) length of the adhesive member movement surface 111). In one or more embodiments, the grooves 111*a* may be formed in the same shape at the pair of long side edges of the adhesive member movement surface 111. In one or more embodiments, the grooves 111*a* may be formed in different shapes at the pair of long side edges of the adhesive member movement surface 111.

Referring to FIG. 5, in one or more embodiments, the groove 111*a* may be formed in a rounded shape. Forming the groove 111*a* in a rounded shape may mean that the bottom surface of the groove 111*a* is formed in a curved line shape. Although the bottom surface of the groove 111*a* is illustrated as having a single curved line, in one or more embodiments the bottom surface may be formed as a plurality of rounds (arc shape).

Referring to FIG. 6, in one or more embodiments, the groove 111*a* may be formed in a "V" shape. Forming the groove 111*a* to be bent in a "V" shape may mean that the bottom surface of the groove 111*a* is formed in a pointed shape. Although the bottom surface of the groove 111*a* is illustrated as having only one pointed shape, in one or more embodiments the bottom surface may be formed as a plurality of bent or pointed shapes.

Referring to FIGS. 2 and 4 to 6, the groove 111*a* may be located at a position spaced apart from an end of the adhesive member movement surface 111. In one or more embodiments, the adhesive member movement surface 111 may include a first guide portion 111*b* formed on each of the pair of long sides thereof. The groove 111*a* may formed at a position spaced apart from the end of the adhesive member movement surface 111, and thus, the first guide portion 111*b* may be located between the groove 111*a* and the end of the adhesive member movement surface 111. In one or more embodiments, a second guide portion 112*a* (see FIG. 2) may be formed on the body 112, and the groove 111*a* may be formed at the second guide portion 112*a* side. The second guide portion 112*a* of the body 112 may be formed to have a height (in a Z-direction) higher than that of the first guide portion 111*b* of the adhesive member movement surface 111, but the present disclosure is not limited thereto, and the first guide portion 111*b* and the second guide portion 112*a* may be formed in the same shape (e.g., the same or substantially the same height). In one or more embodiments, the first guide portion 111*b* may be formed on the pressing surface 1111, and the second guide portion 112*a* may be formed on the body 112.

The guide portion 111*b* may be formed parallel (or substantially parallel) to the groove 111*a*. In one or more embodiments, the guide portion 111*b* may be formed to protrude further outward than the groove 111*a*. In one or more embodiments in which the grooves 111*a* are formed on both sides of the adhesive member movement surface 111, a reference width $2W_a$ of the adhesive member 20 in a longitudinal direction (a Y-direction) may be greater than a width $2W_h$ between the grooves 111*a* formed on both sides of the pair of long side edges of the adhesive member movement surface 111. The width $2W_h$ between the grooves may be defined based on inner side ends of the grooves. Accordingly, in one or more embodiments, edges of the adhesive member 20 may overhang the grooves 111*a*.

In one or more embodiments, the reference width $2W_a$ of the adhesive member 20 in the longitudinal direction (the Y-direction) may be smaller than a width $2W_g$ between the guide portions 111*b* formed on both sides of the pair of long side edges of the adhesive member movement surface 111. Accordingly, an end of the adhesive member 20 is spaced apart by a gap from the guide portion 111*b* above the groove 111*a*, and thus, even when the adhesive layer is transferred to the side surface of the adhesive member 20, an adhesive force (or the adhesive layer) may not be transferred to the guide portion 111*b*. The width $2W_g$ between the guide portions 111*b* may be defined based on inner side ends of the guide portions 111*b*. Since FIGS. 4 to 6 are cutaway views of the end of the taping unit 110, the width $2W_a$ of the adhesive member 20, the width $2W_h$ between the grooves 111*a*, and the width $2W_g$ between the guide portions 111*b* may be respectively described as twice widths Wa, Wn, and Wg in the drawings.

Further, referring to the embodiment depicted in FIG. 2, a plurality of fine holes 111*c* may be formed in the adhesive member movement surface 111 of the taping unit 110. In one or more embodiments, the plurality of fine holes 111*c* of the adhesive member movement surface 111 of the taping unit 110 may be adsorption holes for adsorption of the adhesive member 20. Since the adhesive layer is not formed on the other surface of the adhesive member 20, the adhesive member 20 can be placed on the adhesive member movement surface 111 through adsorption.

Figure 7:
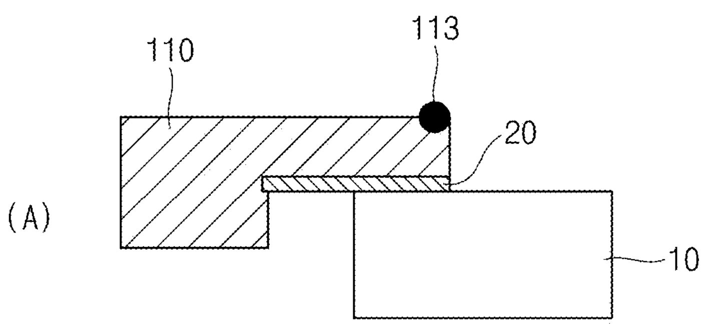
FIG. 7 is a view schematically illustrating a taping process according to an embodiment of the present disclosure.
Figure 7:
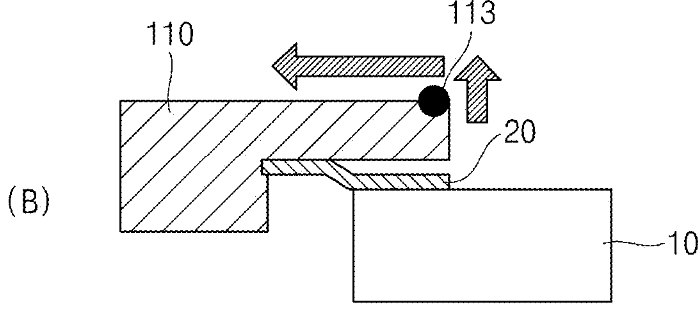
Figure 7:
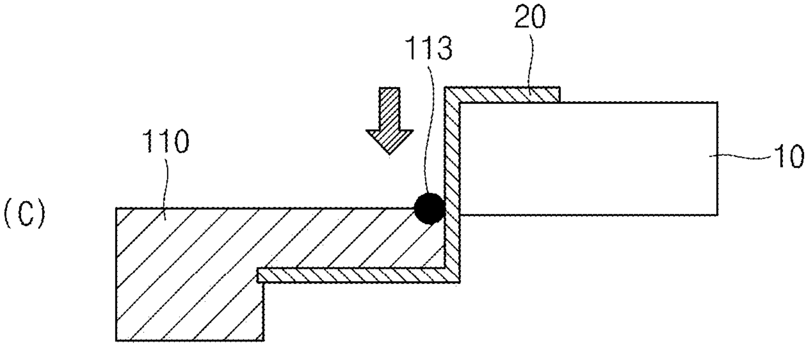

FIG. 7 is a view schematically illustrating a taping process according to an embodiment of the present disclosure.

Referring to FIG. 7, in one or more embodiments, the taping unit 110 may be located at a position to which the adhesive member 20 of the electrode assembly 10 is to be attached (A). In addition, the taping unit 110 may apply the adhesive member 20 to the electrode assembly 10 and press the adhesive member 20 with the pressing surface 1111, and then move to a standby position (B). Thereafter, the taping unit 110 may complete the taping process by surrounding (or substantially surrounding) the electrode assembly 10 with the adhesive member 20 and then cutting the adhesive member 20 with the cutting unit 113 (C). As described above, by forming the groove 111*a* at the edge of the adhesive member placement movement surface 111 of the taping device 100 configured to attach the adhesive member 20 to the secondary battery, it is possible to prevent (or at least mitigate) the phenomenon in which an adhesive force (or the adhesive layer) is transferred to the taping device 100, thereby preventing (or minimizing or at least reducing) a problem in which the adhesive member 20 is not attached to the secondary battery, and accordingly, improving tape attachment performance.

According to an embodiment of the present disclosure, by forming a groove at an edge of an adhesive member placement region of a taping device configured to attach an adhesive member to a secondary battery, it is possible to prevent (or at least mitigate) a phenomenon in which an adhesive force (or the adhesive layer) is transferred to the taping device, thereby preventing (or minimizing or at least reducing) a problem in which the adhesive member is not attached to the secondary battery, and accordingly, improving tape attachment performance.

However, the effects obtained through the present disclosure are not limited to the above-described effects, and other technical effects not described may be clearly understood by a person skilled in the art from the following description of the invention.

The above description is only one embodiment for implementing an exemplary secondary battery according to the present disclosure, and the present disclosure is not limited to the above-described embodiments. As claimed in the following claims, the technical spirit of the present disclosure includes the scope in which various changes can be made by anyone skilled in the art without departing from the gist of the present disclosure. That is, while the present disclosure has been described with reference to specific embodiments and drawings, the present disclosure is not limited thereto, and it is clear by those skilled in the art that various modifications and alterations may be made without departing from the technical spirit of the present disclosure and equivalents of the appended claims.

What is claimed is:

1. A taping device for a secondary battery, the taping device comprising:

a taping unit configured to attach an adhesive member at an adhesive member attachment position on an outer surface of an electrode assembly;

and a supply unit configured to supply the adhesive member to the taping unit, wherein the taping unit comprises:

an adhesive member movement surface on which the adhesive member is configured to be placed, the adhesive member movement surface comprising a pair of long sides and a pair of short sides connected to the pair of long sides, a pressing surface on the adhesive member moving surface that is configured to press the adhesive member to be in close contact with the adhesive member attachment position of the electrode assembly, and at least one groove extending in a lengthwise direction along at least one long side of the pair of long sides of the pressing surface of the adhesive member movement surface, wherein the supply unit is configured to supply the adhesive member to the taping unit in the lengthwise direction.

2. A taping device for a secondary battery, the taping device comprising:

a taping unit configured to attach an adhesive member at an adhesive member attachment position on an outer surface of an electrode assembly; and a supply unit configured to supply the adhesive member to the taping unit, wherein the taping unit comprises:

an adhesive member movement surface on which the adhesive member is configured to be placed, the adhesive member movement surface comprising a pair of long sides and a pair of short sides connected to the pair of long sides, a pressing surface on the adhesive member moving surface that is configured to press the adhesive member to be in close contact with the adhesive member attachment position of the electrode assembly, and at least one groove at at least one long side of the pair of long sides of the pressing surface of the adhesive member movement surface, wherein the taping unit further comprises a cutting unit configured to cut the adhesive member placed on the adhesive member movement surface, and wherein the cutting unit is located at one of the pair of short sides of the adhesive member movement surface.

3. The taping device as claimed in claim 2, wherein the cutting unit is located at the electrode assembly side, and wherein the cutting unit is configured to cut the adhesive member after the adhesive member is pressed by the pressing surface.

4. The taping device as claimed in claim 1, wherein the at least one groove comprises a pair of grooves, and wherein the pair of grooves are formed in a same shape at the pair of long side edges of the pressing surface.

5. The taping device as claimed in claim 1, wherein the at least one groove comprises a pair of grooves, and wherein the pair of grooves are formed in different shapes at the pair of long side edges of the pressing surface.

6. The taping device as claimed in claim 1, wherein the at least one groove comprises a pair of grooves, and wherein each of the pair of grooves extend along substantially an entire length of the adhesive member movement surface, including the pressing surface, and wherein each of the pair of grooves has a same shape.

7. The taping device as claimed in claim 1, wherein the at least one groove comprises a pair of grooves, and wherein each of the pair of grooves extend along substantially an entire length of the adhesive member movement surface, including the pressing surface, and wherein each of the pair of grooves has a different shape.

8. The taping device as claimed in claim 1, wherein the at least one groove has an angular shape.

9. The taping device as claimed in claim 1, wherein the at least one groove has a rounded shape.

10. The taping device as claimed in claim 1, wherein the at least one groove has a "V" shape.

11. The taping device as claimed in claim 1, wherein the pressing surface of the taping unit comprises an elastic material on a metal.

12. The taping device as claimed in claim 1, further comprising a plurality of fine holes in the adhesive member movement surface of the taping unit.

13. The taping device as claimed in claim 1, wherein the at least one groove comprises a pair of grooves along the pair of long side edges of the pressing surface, and wherein a width of the adhesive member in a longitudinal direction is greater than a width between the pair of grooves.

14. A taping device for a secondary battery, the taping device comprising:

a taping unit configured to attach an adhesive member at an adhesive member attachment position on an outer surface of an electrode assembly; and a supply unit configured to supply the adhesive member to the taping unit, wherein the taping unit comprises:

an adhesive member movement surface on which the adhesive member is configured to be placed, the adhesive member movement surface comprising a pair of long sides and a pair of short sides connected to the pair of long sides, a pressing surface on the adhesive member moving surface that is configured to press the adhesive member to be in close contact with the adhesive member attachment position of the electrode assembly, and at least one groove at at least one long side of the pair of long sides of the pressing surface of the adhesive member movement surface, wherein the taping unit further comprises a pair of guide portions along the pair of long sides of the adhesive member movement surface.

15. The taping device as claimed in claim 14, wherein at least one guide portion of the pair of guide portions is substantially parallel to the at least one groove.

16. The taping device as claimed in claim 14, wherein the pair of guide portions protrudes further outward than the at least one groove.

17. The taping device as claimed in claim 14, wherein a width of the adhesive member in a longitudinal direction is smaller than a width between the pair of guide portions at the pair of long side edges of the adhesive member movement surface.

* * * * *